Oct. 29, 1963 S. M. BAGNO 3,109,165
INTRUDER DETECTING SYSTEM
Filed Sept. 5, 1958 3 Sheets-Sheet 1

INVENTOR
Samuel M. Bagno
BY
Ernest A. Beman
ATTORNEY

Oct. 29, 1963
S. M. BAGNO
3,109,165
INTRUDER DETECTING SYSTEM
Filed Sept. 5, 1958
3 Sheets-Sheet 2
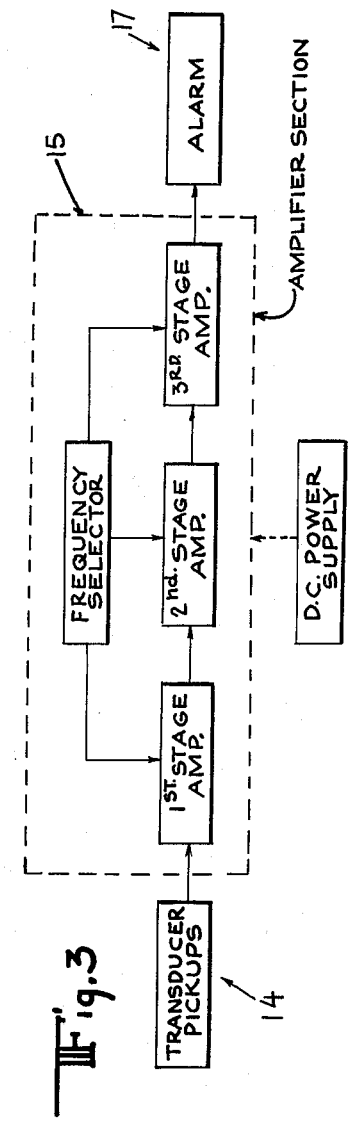
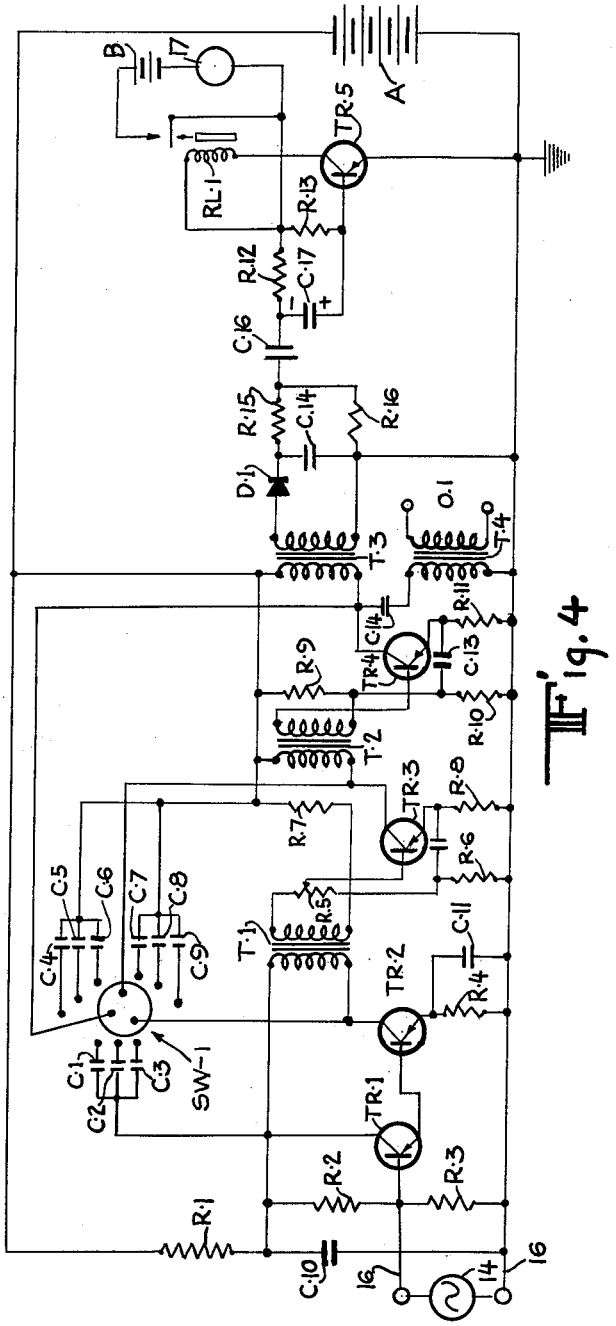
INVENTOR
Samuel M. Bagno
BY
Ernest G. Joenen
ATTORNEY INVENTOR
Samuel M. Bagno
BY
Ernest A. (signature)
ATTORNEY

United States Patent Office 3,109,165
Patented Oct. 29, 1963

3,109,165
INTRUDER DETECTING SYSTEM
Samuel M. Bagno, Belleville, N.J., assignor to Specialties Development Corporation, Belleville, N.J., a corporation of New Jersey
Filed Sept. 5, 1958, Ser. No. 759,249
4 Claims. (Cl. 340—258)

The present invention relates to systems responsive to an intruder, and, more particularly, to such systems for detecting the presence of an intruder upon an area of land in response to energy conducted through the ground by the intruder's footsteps.

In the past, considerable difficulty has been encountered in devising a practical and reliable system for detecting intruders upon a relatively large area of land. All of the systems proposed heretofore were objectionable for one or more reasons such as excessive cost and maintenance, vulnerability to tampering, ineffectiveness to detect intruders, and false alarms or interference by extraneous causes.

The present invention is particularly concerned with protecting property which is adjacent to a highway or a walk for pedestrians where the rumbling of vehicles and footsteps of persons from without should not give an alarm but a person is detected the moment he intrudes upon the property.

It has been discovered that this can be accomplished by burying transducer means in the ground a predetermined distance from the boundary of the property to enable the ground to attenuate and filter out energy at certain frequencies and to enable the transducer to transmit an electrical output corresponding to received energy at other frequencies, and by utilizing equipment such as a tuned frequency amplifier for analyzing the output of the transducer and producing a signal in response to such output at predetermined frequencies for the purpose of operating an alarm.

The feasibility of such an arrangement is based upon the following considerations. In a time domain, sound energy produced by a weight or force exerted on the ground by an intruder has a substantially constant pressure over a short interval of time. In a frequency domain, all the frequencies in the sonic band are present and the frequency of the sound so produced increases as its amplitude decreases. The sound energy in passing through the ground is attenuated in amplitude as the distance of travel increases, the characteristics of the ground being that only a percentage of energy can pass therethrough in a parallel beam at a given distance and the percentage that gets through that given distance decreases very rapidly as the frequency is increased and as the size of the particles of which the earth is composed decrease. Thus the amplitude of the energy produced by the foot step of a person whose weight is within a given range, will be attenuated upon passing through the ground for a predetermined distance to a definite range of values at frequencies within a given band and a certain type of earth.

In an intruder detection system it is desired to confine the protection to a given sensitive area. Beyond this area disturbance can occur without affecting the detection system. Thus false alarms are prevented. Using the above consideration seismic sound energy produced beyond the area to be protected can be attenuated below the range of detection by detecting only the proper portion of the sound spectrum. That portion of the sound spectrum consists of the higher frequency components of the sounds which are attenuated the required amount within that given distance. Those sonic components are selected by a tuned amplifier that follows the detecting transducer. Thus any unattenuated high amplitude energy received by the transducer has a lower frequency than those within the detectable band and would be rejected by the tuned frequency amplifier.

Within the area in which protection is desired the attenuation of those higher frequencies is less than those frequencies are detected. The attenuation is less simply because the transducers, being within the protected area, are closer to the source of the energy so there is less attenuation over that distance.

Accordingly, the object of the present invention is to provide such a system which is simple, practical and economical in construction, and which is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 3 is a block diagram of the alarm system.

FIG. 4 is a wiring diagram of the alarm system.

Figure 1:
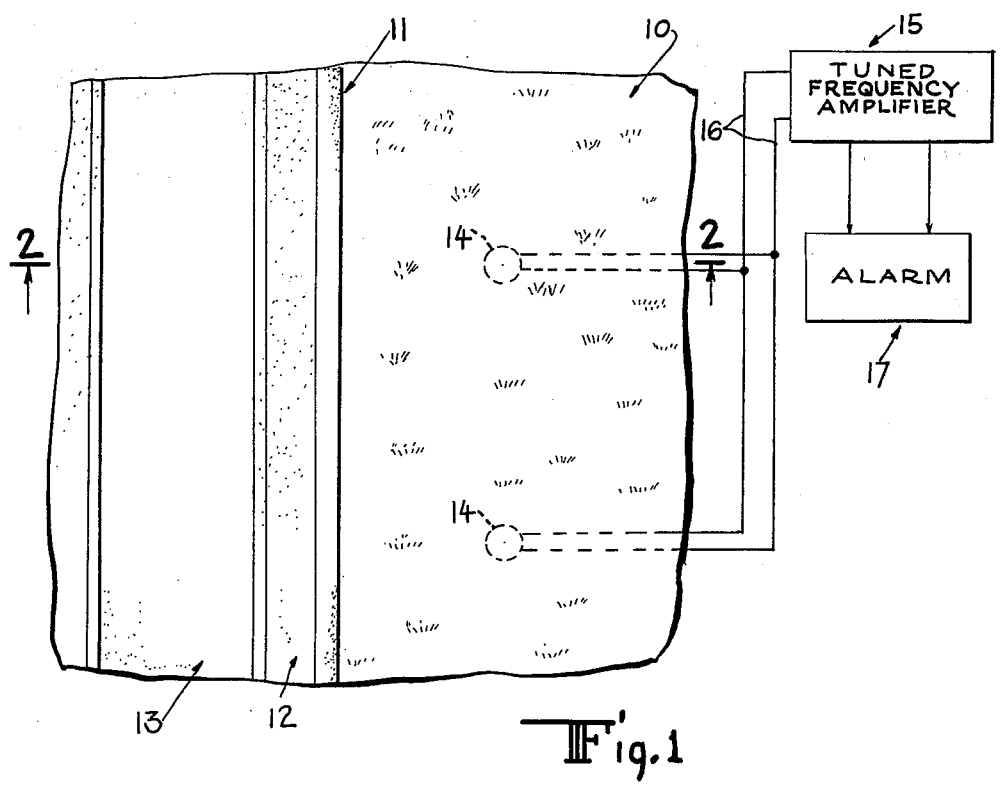
FIG. 1 is a fragmentary plan view of an installation of apparatus in accordance with the present invention on an area of land.
Figure 2:
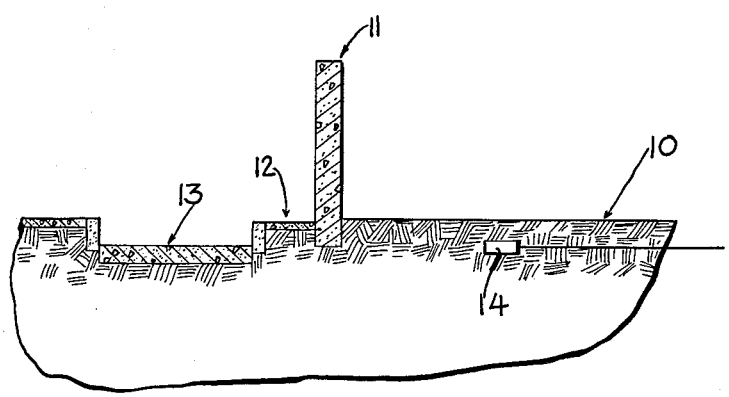
FIG. 2 is a sectional view taken along the line 2—2 on FIG. 1.

Referring in detail to FIGS. 1 and 2 of the drawings, there is shown a portion of an area of land 10, a wall 11 bounding the land, and a walk 12 and a roadway 13 closely adjacent the outside of the wall.

In order to detect an intruder on the land, a system is provided which comprises a plurality of transducers 14 placed on the ground or buried in the ground, a tuned frequency amplifier 15 having the output of the transducers connected in parallel or series to its input by conductors 16, and an alarm 17 connected to the output of the amplifier 15. The transducers preferably are spaced equidistantly from each other. For example, the transducers may be 10 to 15 feet apart from each other and transducer nearest the wall may be about 20 feet therefrom.

The transducers 14 preferably are of the piezoelectric crystal type known wherein the energy sensitive element is constructed of barium titanate. Such transducers are well known and detailed description or illustration thereof is not necessary. A suitable transducer for the present system is disclosed in United States patent application Serial No. 676,146, filed August 5, 1957, now abandoned.

As shown in FIGS. 3 and 4, the amplifier 15 is essentially a tuned, transformer coupled, transistorized grounded collector input, grounded emitter amplifier which is constructed and arranged in a conventional manner to produce an output sufficient to actuate an alarm in response to a weak input. Frequency selecting is attained by tuning the interstage transformers by various preselected values of capacity.

In the wiring diagram shown in FIG. 4, the input signal from the transducers 14 is fed to the base of a transistor TR–1 which is functionally used to match the higher output impedance of the transducers. Voltage dividing resistors R–2 and R–3 provide bias to transistors TR–1 and TR–2. Decoupling is provided by a resistor R–1 and a capacitor C–10, this capacitor also serving to ground the collector of transistor TR–1. Resistor capacitor networks R–4 and C–11; R–6, C–12 and R–8; and R–10, C-13 and R-11 provide adequate bypass and stabilization to transistors TR-2, TR-3 and TR-4, respectively.

A switch SW-1 tunes transformers T-1, T-2 and T-3 to three distinct frequencies by placing capacitors C-3, C-7 and C-4 at 140 c.p.s.; capacitors C-2, C-8 and C-5 at 230 c.p.s.; and capacitors C-1, C-9 and C-6 at 430 c.p.s. across the transformers T-1, T-2 and T-3, respectively.

A variable resistor R-5 serves as a potentiometer for providing gain or sensitivity control; and resistors R-6 and R-7, as well as resistors R-9 and R-10, are essentially voltage dividers providing bias to the transistors TR-3 and TR-4, respectively.

A transformer T-4 and a capacitor C-14 provide isolation and reduction in noise level for a test oscilloscope outlet O-1.

The output of the transformer T-3 is rectified by a diode D-1 and is filtered by a capacitor C-15. Resistors R-15 and R-16 serve as a voltage divider providing bias to a transistor TR-5.

A rate change network including polarized capacitors C-16 and C-17 and resistors R-12 and R-13 serves to de-energize a relay RL-1 only in response to a sudden rate of amplitude change or disturbance of the input signal such as sought to be detected. However, a gradual rate change of input such as caused by an approaching airplane, for example, will not cause the relay to be de-energized. The resistor R-12 has a high impedance to properly bias the polarized capacitors C-16 and C-17.

The system is powered by a source of direct current A, and a battery B connected in series with the relay contacts and the alarm 17 powers the alarm. The relay is normally energized and therefore provides a fail-safe feature in event of a power failure or tampering.

In operation, when an intruder takes a step upon an area of land sought to be protected, the energy produced by the step, upon passing through the ground for a sufficient distance to attenuate the same and filter out energy at frequencies other than predetermined frequencies, is received by a transducer 14 and is converted to an electrical output which is analyzed by the tuned frequency amplifier 15, whereby the amplified output is caused to actuate the alarm 17.

Figure 5:
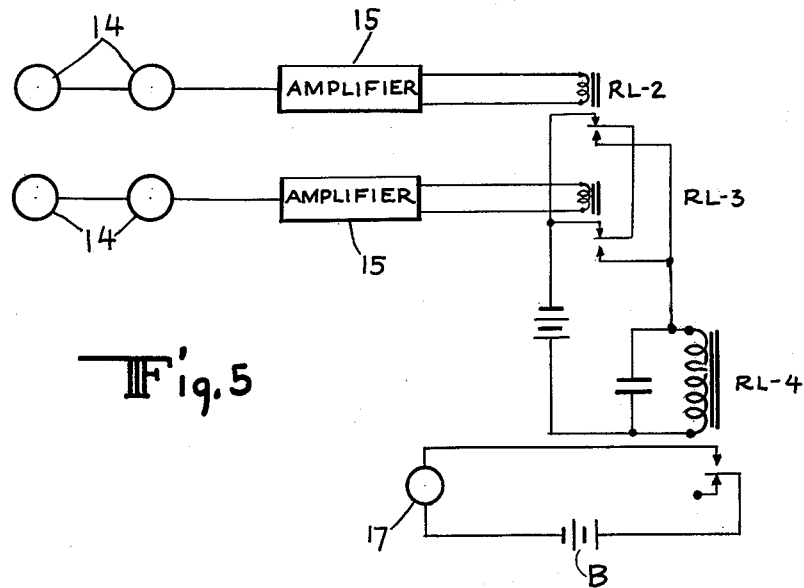
FIG. 5 is a simplified wiring diagram of an alarm system which eliminates certain false alarms.

In FIG. 5, a system is illustrated which is arranged to eliminate false alarms due to a distant disturbance, for example, lightning, shell or blasting explosions, pile drivers or other energy carried underground by rock strata. This system includes two tuned frequency amplifier units 15, such as previously described, each of which has certain transducers 14 connected thereto so that a distant disturbance will be detected by both units to cause normally energized relays RL-2 and RL-3 to be simultaneously de-energized.

However, the alarm 17 is prevented from being actuated by a normally de-energized relay RL-4 having contacts for closing the alarm circuit when energized which relay is connected in an anti-coincidence circuit with the contacts of the relays RL-2 and RL-3 so that the relay RL-4 will remain de-energized when both relays RL-2 and RL-3 are de-energized and will be energized only when either the relay RL-2 or the relay RL-3 is de-energized in response to a disturbance caused by an intruder. The groups of transducers connected to the respective units 15 are a sufficient distance apart to prevent two transducers, one in each group, from picking up a disturbance due to an intruder at the same time.

Figure 6:
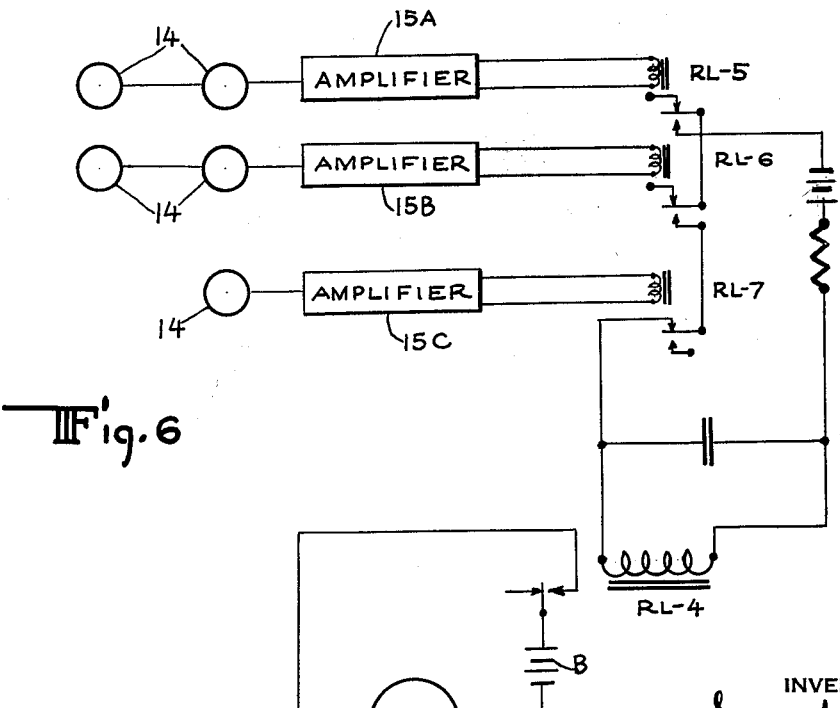
FIG. 6 is simplified wiring diagram of another alarm system which eliminates additional false alarms.

In FIG. 6, a system is illustrated which can eliminate false alarms due to signals generated by a mole, worm or bird at any of the transducers 14 in addition to signals generated by distant disturbances. This system includes three tuned frequency amplifier units 15A, 15B and 15C such as previously described having normally energized relays RL-5, RL-6 and RL-7, respectively. The units 15A and 15B each have a group of transducers 14 connected thereto which are so spaced that a disturbance caused by an intruder will be picked up by at least one transducer in each group.

The contacts of the relays RL-5, RL-6 and RL-7 are connected in a coincidence-anti coincidence circuit with a normally de-energized alarm relay RL-4, with the contacts of the relays RL-5 and RL-6 normally open and the contacts of the relay RL-7 normally closed. Thus, when the units 15A and 15B both have an output simultaneously due to an intruder, the relays RL-5 and RL-6 are de-energized to close the coincidence circuit whereby the alarm relay RL-4 is energized to actuate the alarm 17.

However, since a distubance caused by a mole, worm or bird occurs at only one transducer at a given instance, only the unit to which that transducer is connected has an output to cause its relay to be de-energized and close only one set of contacts in the coincidence circuit, whereby the coincidence circuit is not completed and the relay RL-4 remains de-energized.

The unit 15C has a single transducer connected thereto which is so placed in relation to the transducers in the two groups that it will not pick up a disturbance simultaneously with at least one transducer of each group and break the coincidence circuit. However, when the transducers of all of the units pick up a distant disturbance simultaneously, their outputs will cause the relays RL-5, RL-6 and RL-7 to be de-energized whereby the contacts of relays RL-5 and RL-6 are closed and the contacts of relay RL-7 are opened to cause the anti-coincidence circuit to function and prevent energization of the alarm relay RL-4.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A system for detecting footsteps of an intruder upon an area of ground within a boundary, such footsteps causing sonic energy to be conducted through the ground which system comprises transducer means in the ground located a predetermined distance from the boundary, said transducer means being operable to receive sonic energy conducted through the ground and operable to produce electrical energy at its output corresponding in frequency to the frequency of the sonic energy received, the amplitude of the sonic energy being attenuated to a definite range of low amplitude values at high frequencies within a given band after passing through the ground for a predetermined distance, electro-responsive receiving means having its input connected to the output of said transducer means including a frequency amplifier tuned to selectively detect energy at a predetermined frequency to produce an output and filter out energy at frequencies other than the predetermined frequency, and alarm means controlled by the output of said receiving means.

2. A system according to claim 1, including a plurality of transducer means located at spaced points within the boundary, first and second electro-responsive receiving means having their input connected to the output of at least one different transducer means, and said alarm means include a switching network for actuating said alarm means only in response to the input of one of said receiving means.

3. A system according to claim 1, including a plurality of transducer means of which at least two are located at spaced points with the boundary and at least one is located at a point out of range of sonic energy produced by footsteps of an intruder within the boundary, first, second and third electroresponsive receiving means, said first and second receiving means having their input connected to the output of at least one different transducer means within the boundary and said third receiving means having its input connected to the output of said transducer means out of range of the footsteps of an intruder, and said alarm means includes a switching network for preventing actuation of said alarm means in response to simultaneous outputs of all of said receiving means and for actuating said alarm means only in response to simultaneous outputs of both said first and second receiving means.

4. A system according to claim 1, including a plurality of transducer means located at spaced points within the boundary, first and second electro-responsive receiving means having their input connected to the output of at least one different transducer means, and said alarm means include a switching network for actuating said alarm means only in response to simultaneous outputs of both of said receiving means.

References Cited in the file of this patent
UNITED STATES PATENTS

| | | |
|---|---|---|
| 2,112,826 | Cook | Apr. 5, 1938 |
| 2,238,041 | Dickens | Apr. 15, 1941 |
| 2,355,395 | Rubenstein | Aug. 8, 1944 |
| 2,632,885 | Barclay | Mar. 24, 1953 |
| 2,832,915 | McCoy | Apr. 29, 1958 |
| 2,942,247 | Lienau | June 21, 1960 |